United States Patent [19]

Wiese et al.

[11] Patent Number: 5,101,951
[45] Date of Patent: Apr. 7, 1992

[54] VISCOUS COUPLING WITH PLASTIC HOUSING OR HUB WITH METALLIC RETAINING PARTS

[75] Inventors: Helmut Wiese, Neunkirchen-Seelscheid; Paul-Erich Schönenbrücher, Much-Kranüchel, both of Fed. Rep. of Germany

[73] Assignee: Viscodrive GmbH, Lohmar, Fed. Rep. of Germany

[21] Appl. No.: 661,701

[22] Filed: Feb. 27, 1991

[30] Foreign Application Priority Data

Mar. 30, 1990 [DE] Fed. Rep. of Germany ....... 4010196

[51] Int. Cl.⁵ .................................................. F16D 35/00
[52] U.S. Cl. .................................. 192/58 B; 192/70.2
[58] Field of Search ................. 192/58 B, 58 C, 70.19, 192/70.2

[56] References Cited

U.S. PATENT DOCUMENTS

| | | | |
|---|---|---|---|
| 1,467,732 | 9/1923 | Litle, Jr. ............................. | 192/70.2 |
| 1,524,294 | 1/1925 | Drake et al. ....................... | 192/70.2 |
| 2,276,276 | 3/1942 | Livingston ......................... | 192/70.2 |
| 3,487,903 | 1/1970 | Stickan ............................ | 192/70.2 X |
| 3,543,899 | 12/1970 | Colbert ............................ | 192/70.2 X |
| 4,782,930 | 11/1988 | Kuroiwa et al. .................... | 192/58 B |
| 4,848,506 | 7/1989 | Shimada et al. ..................... | 192/58 X |

FOREIGN PATENT DOCUMENTS 1357106 6/1974 United Kingdom .

Primary Examiner—Leslie A. Braun
Assistant Examiner—Nicholas Whitelaw
Attorney, Agent, or Firm—Harness, Dickey & Pierce

[57] ABSTRACT

The invention relates to a viscous coupling 1 in the case of which one of the two coupling parts, i.e. either the coupling hub 9 or the coupling housing 2, is produced of plastics. To permit non-rotating accommodation of the associated coupling plates 11 or 12, metallic round bars 18 are embedded in the plastic coupling part 2 or 9 so as to be circumferentially distributed. The inner circumference or the outer circumference of the associated coupling plates 11, 12 is provided with an adapted profile. This measure ensures that in spite of the high loads occurring in the course of the transmission of torque it is possible to use plastic parts.

25 Claims, 2 Drawing Sheets

VISCOUS COUPLING WITH PLASTIC HOUSING OR HUB WITH METALLIC RETAINING PARTS

BACKGROUND OF THE INVENTION

The invention relates to a viscous coupling having a coupling housing, at least one coupling hub coaxially and rotatably received therein and annular coupling plates which are designed as overlapping outer and inner plates, which are non-rotatingly connected to the housing and coupling hub via corresponding profiles consisting of projections and indentations, and arranged in a certain sequence so as to be alternately distributed in the interior between the coupling housing and coupling hub along the axes thereof, and further having a fluid at least partialling filling the remaining space.

Such viscous couplings are known from GB-PS 1 357 106, for example, where the outer plates, on their outer circumference, comprise teeth by means of which they are accommodated in corresponding teeth of the coupling housing. The inner plates, in their bore, are also provided with teeth by means of which they are received in outer teeth of the coupling hub. Such viscous couplings are used especially in drivelines of motor vehicles either to achieve a distribution of power between the two driven axles or to be able, at least partially, to lock the differential function between the two driven wheels of one axle when one wheel slips in order to generate traction.

Viscous couplings preferably operate with a silicone oil as fluid which is sheared between the coupling plates. Such viscous couplings operate in two different modes, i.e. in the so-called viscous mode and the hump mode. In the case of the viscous mode, the fluid is subject to a pure shear effect in the region between the coupling plates, whereas in the hump mode, the inner and outer plates are subject to friction locking relative to each other and, in the process, transmit a very much higher torque than in the viscous mode. In consequence, the load resulting from the form-fit between the respective coupling part and the associated plates is correspondingly higher.

SUMMARY OF THE INVENTION

It is the object of the present invention to provide a viscous coupling which has a low weight and may be produced at reasonable cost without any negative effects being exerted on the transmission of torque in the different modes.

In accordance with the invention, the objective is achieved in that both one or both coupling parts, i.e. the coupling housing or coupling hub, consist of plastics. The circumferentially distributed profiles of the coupling housing and/or coupling hub which are provided for torque transmitting purposes and engage the indentations of the profiles of the associated coupling plate are formed by round metallic bars extending parallel to the axis. Plastic parts, i.e. the coupling housing or the coupling hub are easily produced by injection moulding, a method which achieves a considerable reduction in costs and weight. However, to ensure torque transmission in all operating conditions, it is proposed to provide the round bars.

The round bars engage the indentations of the profiles of the coupling plates. They distribute the load evenly to the coupling housing and coupling hub. The round bars are form-fittingly connected to the coupling hub and coupling sleeve respectively. However, in a preferred embodiment, the round bars are formed in during the production of the coupling housing and/or coupling hub. The round bars are inserted into the moulding tool for the respective coupling part and embedded in the course of the injection moulding process. Depending on the type of application, i.e. the required torque transmitting capacity, the number of round bars can easily be adapted because it is simply a case of exchanging inserts in the mould.

The plastic material is preferably a material of the polyphenylene-sulphide group; it is characterised by a good stability of shape.

To improve the strength properties of the plastic material it may be fibre-reinforced. The fibres may be carbon or glass fibres which take the form of short fibres and, as such, may be included during the injection moulding process. They are distributed in the base material.

To improve the thermal conductivity of the plastic material it may be mixed with metal in the form of chips or powder. The metal may be either aluminium or brass in order to avoid overheating of the coupling.

The coupling hub and coupling housing serve to introduce and pass on torque. They are normally provided with teeth via which they are connected to a set of counter-teeth. In a further embodiment of the invention it is therefore proposed to provide the plastic coupling parts, i.e. the coupling housing and/or coupling hub, with a formed-in metal ring comprising teeth.

Furthermore, it is proposed in accordance with the invention to provide the bearing seats between the two coupling parts with a metal bearing ring formed into the coupling part consisting of plastics.

Finally, it is proposed that the round bars should consist of drawn round steel sections. The round bars are preferably hardened. The round bars may also take the form of needles such as they are used in needle bearings, or cylindrical pins such as they are used for producing prepunched holes, thereby permitting the use of cheap production parts.

BRIEF DESCRIPTION OF THE DRAWINGS

Preferred embodiments of the invention are diagrammatically illustrated in the drawing wherein.

DETAILED DESCRIPTION OF THE PREFERRED EMBODIMENT

Figure 1:
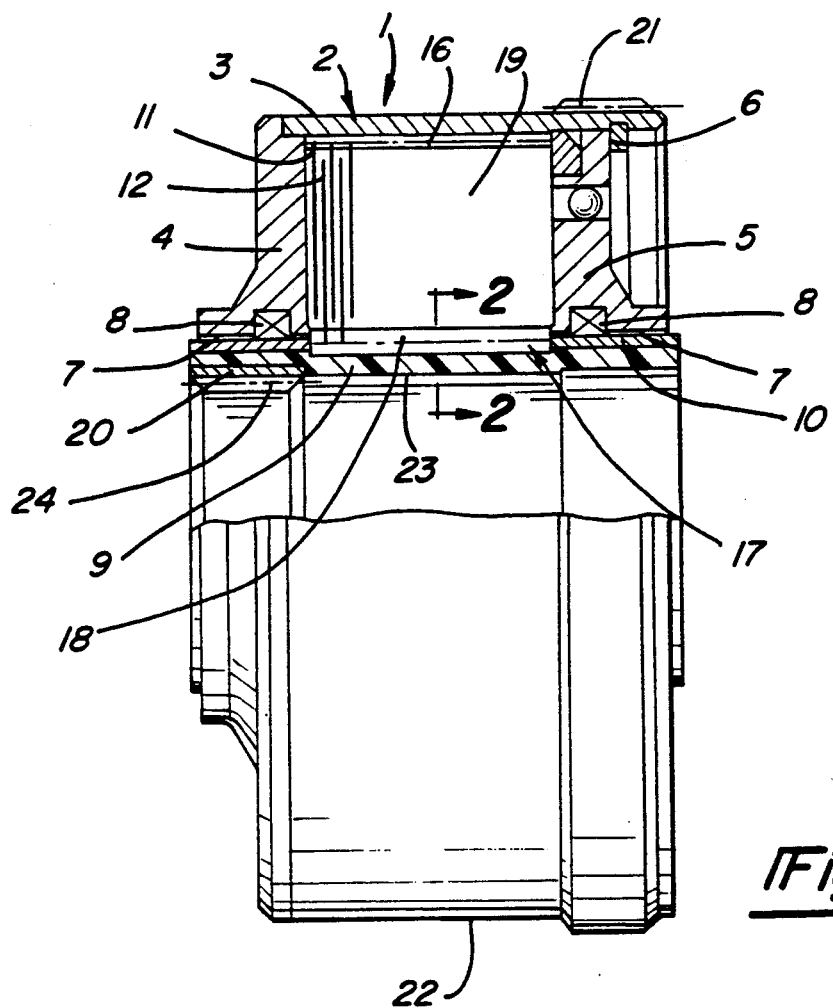
FIG. 1 shows a viscous coupling in accordance with the invention, half in the form of a plan view and half in the form of a cross-section.
Figure 2:
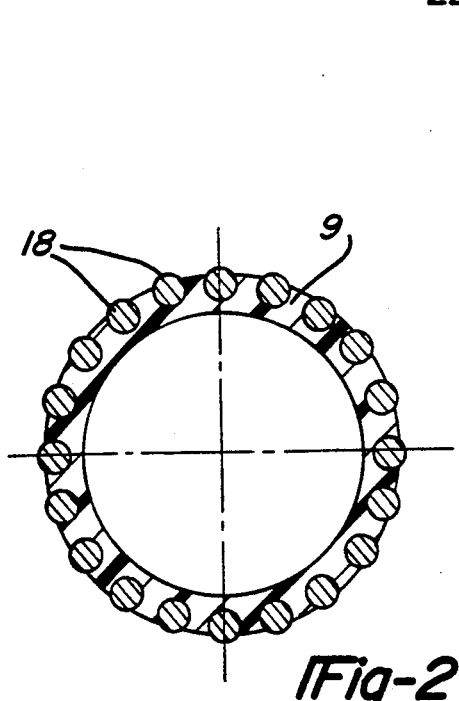
FIG. 2 is a section 1 according to FIG. 1 through the coupling hub produced of plastics.
Figure 3:
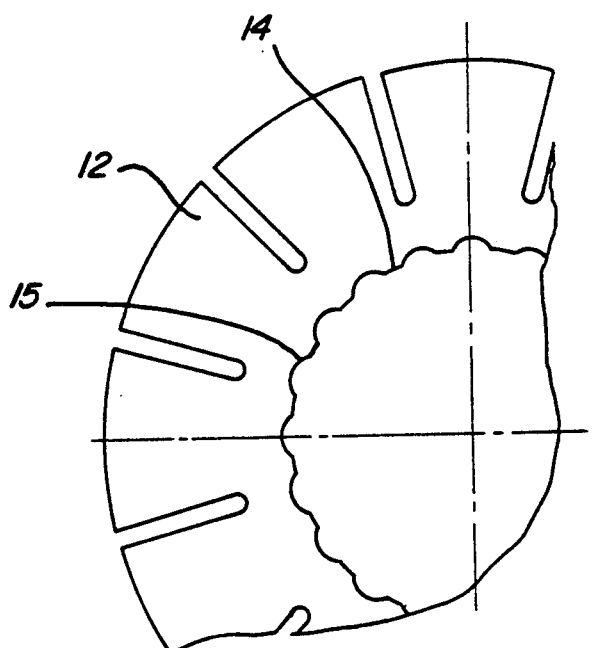
FIG. 3 shows an inner plate suitable for the coupling hub according to FIG. 2.

In the case of the viscous coupling illustrated in FIG. 1 the coupling housing has been given the reference number 2. The coupling housing 2 consists of a housing casing 3 and an end wall 4 firmly attached thereto. Furthermore, the housing casing is associated with a cover 5 attached to the housing casing 3 by a securing ring 6 to prevent axial displacement. The end wall 4 and the cover 5 comprise bearing bores 7 rotatably accommodating a coupling hub 9. For sealing purposes, seals 8 are inserted between the bearing faces of the coupling hub 9 and the bearing bores 7. The cover 5 is also sealed by a seal 8 relative to the housing casing 3. In the region between the end wall 4 and the cover 5, the housing casing 3 is provided with circumferentially distributed profiles 16 extending parallel to the axis x—x and consisting of raised portions and indentations. The coupling hub 9 is also provided with profiles 17 which, as shown especially in FIG. 2, consist of round bars 18 which are made of metal and are hardened. Lengthwise, the round bars 18 also extend along the axial distance between the housing end wall 4 and the cover 5. They are embedded in the wall of the hollow coupling hub 9. The profile 16 of the metallic housing casing 3 non-rotatingly receives the outer plates 11 with their corresponding profile 15 while the profile 17 in the form of round bars 18 of the coupling hub 9 receives the inner plates 12 with their corresponding profile 15. The profiles 15 are adapted to the cross-section of the round bars 18. They are obtained in that they start from the inner circumference 14 of the bore of the inner plates 12. The outer circumference 13 of the inner plates 12 is designed to be circular. In the case of the outer plates 11, the bore 14 is designed to be circular. The inner plates 12 and outer plates 11 are arranged in the interior 19 so as to be distributed in a certain sequence. Otherwise, the interior 19 is at least partially filled with a fluid, for example silicone oil. The transmission of torque between the inner plates 12 and the coupling hub 9 is effected via the round bars 18 embedded in the coupling hub 9.

In the driveline of passenger cars, the viscous coupling 1, in the form of an intermediate axle differential, preferably serves to distribute torque to the wheels of the front axle and those of the rear axle or to lock the differential function of a differential arranged between the wheels of one axle if slip occurs. To achieve a non-rotating connection with the input or output end, the outer face 22 of the housing casing 3 is provided with teeth 21. As the housing casing 3 is made of metal, the teeth may form part of the housing casing 3. However, a different method has to be chosen for the teeth associated with the coupling hub 9: a metal ring 20 provided with the teeth 20 is formed into the plastic coupling hub 9 in the course of the production thereof. The metal ring 20 is attached in the bore 23 of the coupling hub 9. In the case of the embodiment illustrated in FIG. 1, the coupling hub 9 is provided with a formed-in bearing ring 10 which is part of the coupling hub 9 and was also formed in during the injection moulding operation. It serves to provide support in the bore 7 of the cover 5 and the end wall 4 of the housing. In the case of the embodiment to FIG. 1, the bearing ring 10 is illustrated merely as being associated with the housing cover 5. It may also be associated with the bearing bore 7 of the housing end wall 4 if the coupling housing 3 is made of plastics in accordance with the embodiment to FIG. 4.

Figure 4:
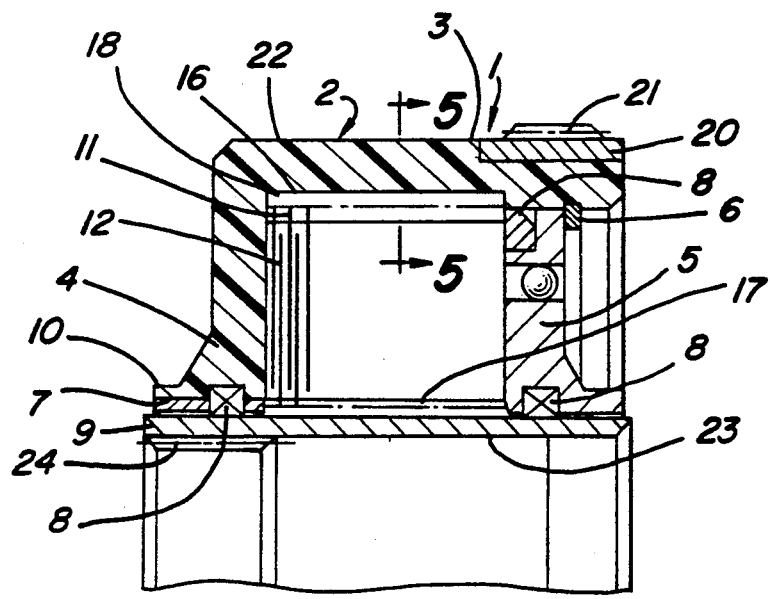
FIG. 4 illustrates a viscous coupling whose housing is made of plastics.
Figure 6:
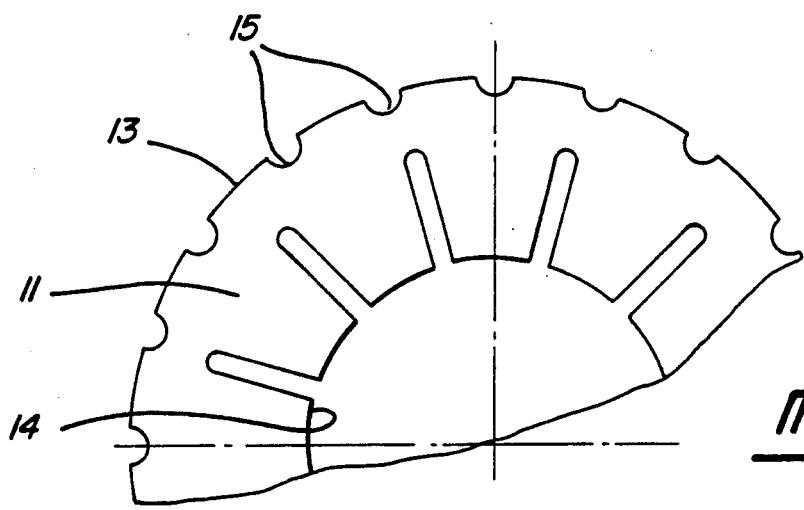
FIG. 6 shows a profiled outer plate suitable for the housing according to FIG. 5.
Figure 5:
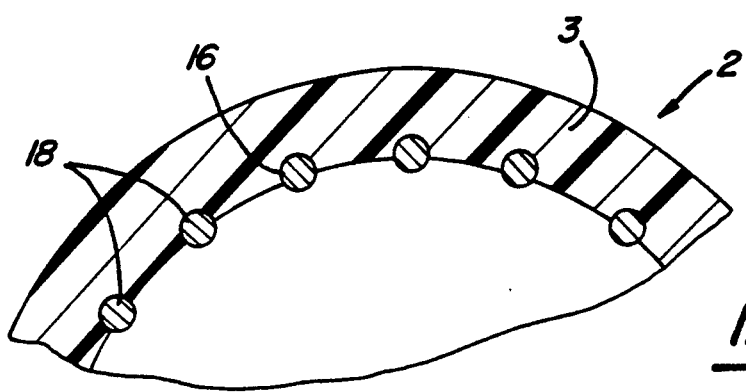
FIG. 5 is a section through the housing casing according to section line 4 according to FIG. 4.

In that case, the housing case 3 is designed to be integral with the housing end wall 4 as shown in FIG. 4. The teeth 21 associated with the outer face 22 of the coupling housing 2 form part of a metal ring 20 formed in during the production of the coupling housing 2. Again, the cover consists of metal, as does the coupling hub 9. The teeth 24 of the coupling hub 9 are directly formed into the bore 23. The profile 17 for the inner plates 12 forms part of the outer face of the coupling hub 9, whereas the profile 16 receiving the outer plates 11 with their outer circumference 13 is associated with the housing casing 3. For this purpose, as can be seen in FIGS. 4 and 5, the round bars 18 are embedded into the housing wall along the length of the housing casing 3 between the housing end wall 4 and the cover 5 and extend parallel to the axis x—x. As may be seen in FIG. 6, the outer plate 11 is provided with a profile 15 designed to correspond to the profile 16 comprising the round bars 18. For this purpose, starting from the outer face, the outer circumference 13 of the outer plate 11 is provided with intendations whose positions correspond to the distribution of the round bars 18. The inner circumferential face 14 of the bore of the outer plate 11 is designed to be circular.

We claim:

1. A viscous coupling comprising:

a housing;

at least one hub rotatably received with said housing, said housing, at least one hub or both being formed from a plastic material;

a plurality of interleaved annular coupling plates extending from said housing and said at least one hub;

a plurality of metallic retaining bars circumferentially spaced and embedded in said plastic housing, hub or both for retaining said plurality of annular plates on said housing and hub;

a plurality of indentations in said plurality of plates for engaging said plurality of metallic bars; and at least one gap formed between said housing, at least one hub and said plate with a fluid at least partially filling said at least one gap.

2. A viscous coupling according to claim 1 wherein said housing and said hub are produced by injection molding.

3. A viscous coupling according to claim 1 wherein a metal ring with teeth is formed into said hub or said housing.

4. A viscous coupling according to claim 1 wherein a bearing ring is formed into said hub or said housing.

5. A viscous coupling according to claim 1, wherein said bars are produced from drawn round steel sections.

6. A viscous coupling according to claim 1, wherein said bars consist of cylindrical pins.

7. A viscous coupling according to claim 1, wherein said bars consist of needles.

8. A viscous coupling according to claim 1 wherein said plastic material is a material of the polyphenylenesulfide group.

9. A viscous coupling according to claim 8, characterized in that the plastic material is fibre-reinforced.

10. A viscous coupling according to claim 8, characterized in that metal in the form of chips or powder is added to the plastic material.

11. A viscous coupling according to claim 8, wherein said housing and said hub are produced by injection moulding.

12. A viscous coupling according to claim 1 characterised in that metal in the form of chips or power is added to the plastic material.

13. A viscous coupling according to claim 12, characterised in that the metal is aluminium or brass.

14. A viscous coupling according to claim 12, wherein said housing and said hub are produced by injection moulding.

15. A viscous coupling according to claim 13, wherein said housing and said hub are produced by injection moulding.

16. A viscous coupling according to claim 1 wherein said bars are embedded during the production of said housing and/or said hub.

17. A viscous coupling according to claim 16, wherein said plastic material is a material of the polyphenylene-sulphide group.

18. A viscous coupling according to claim 16, characterized in that the plastic material is fibre-reinforced.

19. A viscous coupling according to claim 16, characterized in that metal in the form of chips or power is added to the plastic material.

20. A viscous coupling according to claim 16, wherein said housing and said hub are produced by injection moulding.

21. A viscous coupling according to claim 1 characterised in
that the plastic material is fibre-reinforced.

22. A viscous coupling according to claim 21, characterized in that metal in the form of chips or powder is added to the plastic material.

23. A viscous coupling according to claim 21, wherein said housing and said hub are produced by injection moulding.

24. A viscous coupling according to claim 21, wherein said fibres are selected from the group consisting of carbon or glass fibres and take the form of short fibres.

25. A viscous coupling according to claim 24, wherein said housing and said hub are produced by injection moulding.

* * * * *